United States Patent [19]

Lehnhoff

[11] Patent Number: 4,562,387
[45] Date of Patent: Dec. 31, 1985

[54] VEHICLE POWER WINDOW CONTROL

[75] Inventor: Richard N. Lehnhoff, Kettering, Ohio

[73] Assignee: General Motors Corporation, Detroit, Mich.

[21] Appl. No.: 674,689

[22] Filed: Nov. 26, 1984

[51] Int. Cl.$^4$ .............................................. H02P 1/22
[52] U.S. Cl. .................................... 318/285; 318/265;
318/286; 318/294; 318/345 B; 318/345 C;
318/469
[58] Field of Search ............... 318/280, 281, 282, 286,
318/293, 294, 345 B, 345 C, 265, 266, 267, 285,
466, 469

[56] References Cited

U.S. PATENT DOCUMENTS

| 4,001,661 | 1/1977 | Terabayashi | 318/264 |
| 4,328,451 | 5/1982 | Barge | 318/596 |
| 4,338,552 | 7/1982 | Pilz et al. | 318/286 X |
| 4,347,465 | 8/1982 | Goertler | 318/286 X |
| 4,373,149 | 2/1983 | Coste | 318/256 X |
| 4,394,605 | 7/1983 | Terazawa | 318/256 X |
| 4,404,558 | 9/1983 | Yen | 318/285 X |
| 4,459,521 | 7/1984 | Barge | 318/257 |
| 4,476,416 | 10/1984 | Licata et al. | 318/283 |
| 4,477,751 | 10/1984 | Kanayama | 318/280 |
| 4,514,666 | 4/1985 | Suzuki | 318/293 |

FOREIGN PATENT DOCUMENTS

| 0107537 | 5/1984 | European Pat. Off. . | |
| 2820330 | 11/1979 | Fed. Rep. of Germany | 318/282 |
| 2484168 | 12/1981 | France . | |
| 2013482 | 8/1979 | United Kingdom . | |

Primary Examiner—B. Dobeck
Assistant Examiner—Bentsu Ro
Attorney, Agent, or Firm—Robert M. Sigler

[57] ABSTRACT

A control for a vehicle window driving motor in an H-switch semiconductor bridge with an SCR and a FET in each opposite armature current path includes control logic circuitry enabling one-touch actuation of window movement in either direction with stoppage by actuating either actuation device and with flip-flop control of the bridge elements to prevent shorting out the power supply. A variation provides automatic stoppage in the up direction by stall current sensing with automatic reverse after a time delay to allow the SCR conducting during upward movement to turn off.

5 Claims, 2 Drawing Figures ically they may take a variety of forms, including two separate open-biased push button switches or a single rocking actuator biased into an open central position but actuable either way to close the separate switches. Other mechanical constructions will accur to those skilled in the art.

VEHICLE POWER WINDOW CONTROL

BACKGROUND OF THE INVENTION

This invention is a vehicle power window control of the one-touch type, in which window movement in the up or down direction is initiated by a single actuation of the up or down switch, respectively, and continues until either switch is reactuated or until travel limit or an obstruction is sensed.

In the prior art, conventional window controls actuate window movement only as long as the up or down switch is held. Recently suggested one-touch power window controls generally provide operator control logic which might not be considered optimum for all vehicle operators. For example, the U.S. Pat. Nos. 4,001,661, to Terabayashi issued Jan. 4, 1977, and to Terazawa 4,394,605, issued July 19, 1983, show one-touch actuators in which window movement, once initiated, may be stopped by the operator only by actuating the control in the opposite direction.

The U.S. Pat. No. 4,373,149 to Coste shows a power window control having control logic in which window motor actuation, once initiated, is stopped by operator actuation in either direction. However, the Coste control, which includes two resettable toggle flip-flops, may achieve a situation in which both flip-flop outputs are in the power activating condition simultaneously. This would occur particularly when the window is being driven in one direction and the operator stops it by pushing the actuating switch into the actuation position for window movement in the opposite direction. In this case both flip-flops simultaneously generate activating outputs temporarily before these simultaneous outputs are sensed by the detection circuit which resets both flip-flops. In the Coste system this is no problem because of the specific relay actuated motor drive connections used. However, it is desirable in some cases to provide a solid state electronic motor drive circuit without relays, which add size and cost to the system. In a motor reversing, solid state H-switch bridge circuit, it is not advisable to allow a situation in which all solid state switches are simultaneously closed, since a direct short circuit of the power supply through the solid state switches may result.

SUMMARY OF THE INVENTION

Therefore, the object of this invention is to provide a vehicle power window control using solid state, electronic motor actuation circuitry in which the window, once actuated in a first direction, continues moving until the operator actuates the actuating switch in either direction, but in which such actuation cannot produce a situation in the control circuitry potentially damaging thereto.

Specifically, it provides motor control apparatus for a motor vehicle window capable of movement between an open and a closed position comprising a motor in an H-switch semiconductor bridge drive circuit effective to drive the window motor selectively toward the open or closed positions of the window, first and second actuating means, a toggle flip-flop having toggle and reset inputs and an output deactivated when the reset input is activated, an OR logic circuit connecting the first and second actuating means to the toggle input of the toggle flip-flop, a second flip-flop having a set input responsive to the first actuating means and a reset input responsive to the second actuating means and a pair of outputs, each of the outputs activated in a different one of two stable states, a first AND logic circuit having inputs from the output of the toggle flip-flop and one of the outputs of the second flip-flop and an output connected to activate the motor drive circuit in one direction, a second AND logic circuit having inputs from the output of the toggle flip-flop and the other of the outputs of the second flip-flop and an output connected to activate the motor drive circuit in the other direction and means effective to detect motor stall current due to the travel limit positions of the window or an obstruction to window movement and activate the reset input of the toggle flip-flop.

The output of each of the two AND logic circuits controls whichever transistors or other solid state switches are used in the H-switch arrangement for each motor actuation direction. However, since the AND logic circuits each have, as one of their respective inputs, one of the alternative outputs of the second flip-flop, the transistors for opposite motor drive actuation cannot be simultaneously actuated; and the possibility of a short circuit of the power supply is avoided.

In addition, means may be provided to initiate motor operation in the reverse direction when stall current is detected when the window is moving toward, but has not yet reached, its upper travel limit.

Further details and advantages of the invention will be apparent from the accompanying drawings and following description of a preferred embodiment.

DESCRIPTION OF THE PREFERRED EMBODIMENT

Figure 1:
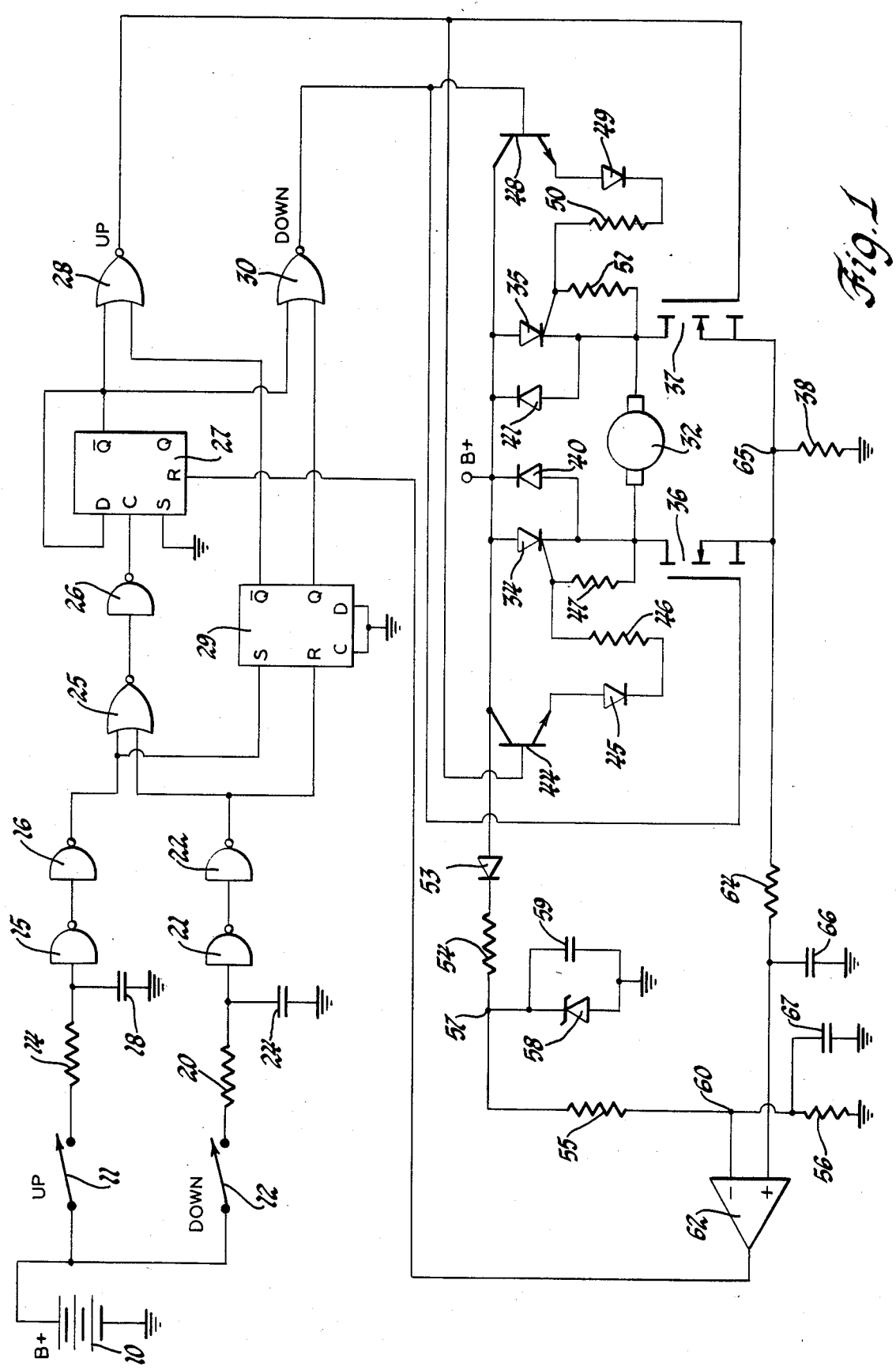
FIG. 1 shows a circuit diagram of a preferred embodiment of this invention.

Referring to FIG. 1, a source of electric power 10, such as a vehicle battery or generating system with the usual voltage regulation has a grounded terminal as shown and a B+ terminal providing electric current at a predetermined voltage to an up switch 11 and a down switch 12. Each of switches 11 and 12 may be described electrically as a single pole, single throw switch, but mechanically they may take a variety of forms, including two separate open-biased push button switches or a single rocking actuator biased into an open central position but actuable either way to close the separate switches. Other mechanical constructions will accur to those skilled in the art.

The other side of switch 11 is connected through a resistor 14 and consecutive inverters 15, 16, which may be of the Schmitt trigger variety, to one input of a NOR gate 25, with the input of inverter 15 connected through a capacitor 18 to ground. Likewise, the other side of switch 12 is connected through a resistor 20 and consecutive inverters 21, 22 to the other input of NOR gate 25, with the input of inverter 21 connected through a capacitor 24 to ground. The output of NOR gate 25 is provided through an inverter 26 to the clock or C input of a flip-flop 27 having grounded S input and a not-Q output connected to a data or D input and to one input of a NOR gate 28. Flip-flop 27 is thus connected as a toggle or divide-by-two flip-flop with the C input as the signal input and further includes an R input that is used to reset to a high not-Q output.

The outputs of inverters 16 and 22 are also applied to the S and R inputs, respectively, of another flip-flop 29, which has grounded C and D inputs, a not-Q output connected to the other input of NOR gate 28 and a Q output connected to an input of a NOR gate 30. The other input of NOR gate 30 receives the not-Q output of flip-flop 27. Flip-flop 29 is connected as an R-S flip-flop; and NOR gates 28, 30 both operate as AND logic circuits in the context of the overall circuit. Switches 11, 12 with the following R-C filter and Schmitt trigger debouncing circuitry are actuators for the window in the up and down directions, respectively. NOR gate 25 is an OR logic circuit in the context of the overall circuit. Flip-flops 27 and 29 may be of the type known as MC14013 or the equivalent; and the various gates and inverters may be obtained from chips known as MC14001 and MC14093 or the equivalent.

In operation, closure of the vehicle ignition switch, not shown, causes power to be applied to the circuit chips and flip-flop 27 to be reset to a not-Q output. The latter may be assured, if desired, by the inclusion of a power-on-reset circuit described for the embodiment of FIG. 2 below. It does not matter which state flip-flop 29 is in at this point. If up switch 11 is closed, flip-flops 27 and 29 both have Q outputs activated high so that the output of NOR gate 28 is high and the output of NOR gate 30 is low. NOR gate 28 provides the up driving signal to motor driving circuitry yet to be described, even if switch 11 is opened. As the window is raised, the output of NOR gate 28 can be sent low again without affecting the output of NOR gate 30 by providing a high signal to input R of flip-flop 27 or by activating either of switches 11 or 12. Any of these actions will change the state of flip-flop 27 to turn off motor actuation by providing a high input to both of NOR gates 28 and 30. The same description applies to the initial actuation of down switch 12, except that flip-flop 29 is originally put in a state with a high not-Q output to cause a high output from NOR gate 30, which is the down driving motor actuation signal.

The motor 32 itself is a reversible DC motor of either permanent magnet or wound field with the former preferred. The armature connections only are shown and described; field connections for a wound field motor are considered well known in the art. Motor 32 is connected with its armature terminals in an H-switch bridge arrangement with SCRs 34, 35 (2N6400) and power FETs 36, 37 (BUZ 10 or TP5000) between the B+ supply and ground, with the drain of FET 36 connected to one armature terminal of motor 32 and to the cathode of SCR 34 and the drain of FET 37 connected to the other armature terminal of motor 32 and the cathode of SCR 35. The anodes of SCRs 34, 35 are both connected to the B+ supply; and the sources of FETs 36, 37 are connected together and through a small resistance, high wattage resistor 38 to ground. Resistor 38 may comprise, for example, a 2.11 inch strip of 1 ounce copper with a width of 0.032 inches and a resistance of 0.03 ohms. SCRs 34 and 35 are reverse-bypassed by diodes 40 and 41, respectively, in the normal manner for switched inductive circuits. An NPN bipolar transistor 44 (2N3904) has a collector connected to the B+ supply and an emitter connected through a diode 45 (1N4004) and resistor 46 (100 ohms) to the gate of SCR 34, which gate is also connected through a resistor 47 (1 K) to the drain of FET 36. Likewise, an NPN bipolar transistor 48 has a collector connected to the B+ supply and an emitter connected through a diode 49 and resistor 50 to the gate of SCR 35, which gate is connected through a resistor 51 to the drain of FET 37. The base of transistor 44 and the gate of FET 37 are both connected to the output of NOR gate 28 to drive motor 32 in the up direction; likewise, the base of transistor 48 and the gate of FET 36 are both connected to the output of NOR gate 30 to drive motor 32 in the down direction.

The B+ supply is connected through the series combination of a diode 53 (1N4004) and three resistors 54 (47 ohm), 55 (10 K) and 56 (499 ohm) to ground. Junction 57 beteen resistors 54 and 55 is also connected to ground through a parallel zener diode 58 (12 volt) and capacitor 59 (22 uF) to provide a regulated voltage at junction 57. Resistors 55 and 56 thus form a voltage divider which generates a reference voltage at junction 60 thereof, which is provided to the inverting input of a comparator 62 (CA3140). The non-inverting input of comparator 62 is connected through a resistor 64 (10 K) to junction 65 of resistor 38 and the sources of FETs 36 and 37. It is also connected through a capacitor 66 (22 uF) to ground; and the inverting input is also connected through a capacitor 67 (1 uF) to ground. The output of comparator 62 is connected to the R input of flip-flop 27. Comparator 62 compares the voltage dropped across resistor 38 by the armature current of motor 32 to the reference at junction 60 and switches its output high when the armature current increases due to the stalling of the motor upon full travel of the window or encounter of an obstacle.

Figure 2:
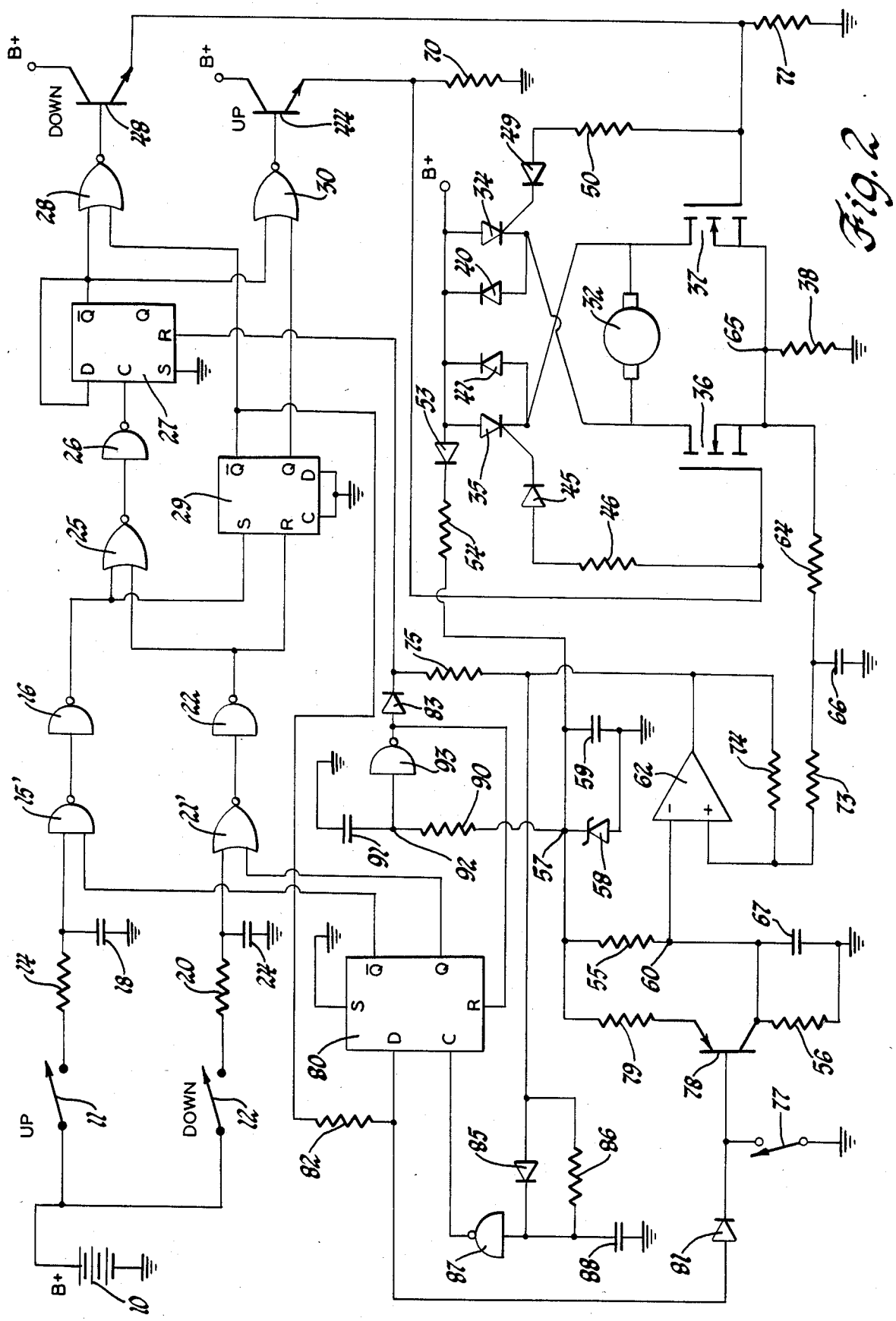
FIG. 2 shows a circuit diagram of a variation of the embodiment of FIG. 1.

FIG. 2 shows a variation of the circuit of FIG. 1 which shows how to modify it to reverse automatically if the window encounters an obstruction prior to its upper travel limit while moving upward. Elements 10 through 30 of FIG. 1 appear in FIG. 2 unchanged in form or arrangement except for inverters 15 and 21, which become, respectively, NAND gate 15' and NOR gate 21' in FIG. 2, each of NAND gate 15' and NOR gate 21' having an extra input with connection to be described below. The operation of this portion of the circuit of FIG. 2 is the same as that of the corresponding portion of the circuit of FIG. 1, except for the possibility of actuating flip-flops 27 and 29 through the additional inputs of NAND gate 15' and NOR gate 21', which inputs are used to produce automatic reversing in a manner to be described below.

The elements of the motor driving and stall current sensing circuitry of FIG. 2 generally correspond to those of FIG. 1, with the following exceptions. The gates of FETs 36 and 37 are connected to the emitters of transistors 44 and 48, respectively, rather than directly to NOR gates 28 and 30 as in FIG. 1. They are also connected to ground through resistors 70 and 71, respectively. Series resistor 46 and diode 45 are reversed from the order shown in FIG. 1, as are resistor 50 and diode 49. Resitors 47 and 51 of FIG. 1 do not appear in FIG. 2. Resistor 64 and capacitor 66 are connected to the non-inverting input of comparator 62 through a resistor 73 (1 K); and a positive feedback resistor 74 (1 M) is provided around comparator 62. Finally, a resistor 75 (10 K) is provided between the output of comparator 62 and the R input of flip-flop 27. These changes do not significantly affect the operation of these portions of the circuit as described with reference to FIG. 1.

In order to differentiate between stall current due to full travel of the window and stall current due to an obstruction short of full travel, a limit switch 77 is provided which is normally open but closes just before the window of the vehicle reaches its fully closed position.

No such switch is needed for the fully open position, since obstacles are not generally encountered by an opening window. Switch 77 is electrically connected between ground and the base of a PNP bipolar transistor 78 (2N3906) having an emitter connected through a resistor 79 (10 K) to junction 57 and a collector connected to junction 60. Closure of switch 77 turns on transistor 78 to put resistor 79 in parallel with resistor 55 and thus increase the reference voltage on junction 60. Thus the circuit can be designed to sense a lower motor stall current with switch 77 open, when such stall current is due to an obstruction, than when switch 77 is closed, when such stall current is due to the travel limit of the vehicle window.

A flip-flop 80 (MC14013) has a grounded S input, a D input connected through a diode 81 (1N4004) and switch 77 to ground and also through a resistor 82 (10 K) to the not-Q output of flip-flop 29, a not-Q output connected to the other input of NAND gate 15' and a Q output connected to the other input of NOR gate 21'. Flip-flop 80 is normally placed in a state with a high not-Q output to enable NAND gate 15' for up motor actuation when switch 11 is closed; but it may be switched to the opposite state with a high Q output to initiate motor down operation through NOR gate 21'.

The output of comparator 62 is connected through a parallel diode 85 (1N4004) and resistor 86 (1 M) to the input of an inverter 87, which input is also connected through a capacitor 88 (0.1 uF) to ground. The output of inverter 87 is connected to the C input of flip-flop 80. When stall current increases in motor 32 sufficiently to cause the output of comparator 62 to go high, capacitor 88 is charged quickly through diode 85. The output of comparator 62 also turns off the motor actuation through the R input of flip-flop 27, but a time delay is needed to allow current to decrease to zero in SCR 34, which has been conducting in upward window movement, before downward movement is initiated in order to prevent shorting of the power supply through SCR 34 and FET 36. The decrease of motor current causes comparator 62 to switch its output low again; and the discharge of capacitor 88 through resistor 86 provides this time delay. The falling edge output from inverter 87 to the C input of flip-flop 80 upon the charging of capacitor 88 had no effect on the output of the flip-flop; but the rising edge output from inverter 87 to flip-flop 80 after the discharge of capacitor 88 causes a change in the output state of the flip-flop to that with a high Q output. Thus stall cuurent through motor 32 with switch 77 open causes an immediate halt of motor operation with a following reversal of the motor after a time delay sufficient to ensure cessation of current flow in the SCRs.

Junction 57 is connected through a resistor 90 (1 M) and capacitor 91 (0.1 uF) to ground. Junction 92 of resistor 90 and capacitor 91 is connected to the input of an inverter 93 having an output connected to the R input of flip-flop 80 and, through diode 83, to the R input of flip-flop 27. These elements provide a power-on-reset function to initially reset both flip-flops 27 and 80 upon initial closure of the ignition switch, not shown. After this initial reset, capacitor 91 charges, the inverter switches to a low output, and these elements have no further effect upon the circuit.

The overall operation of the circuit of FIG. 2 will now be described. Upon initial power up, flip-flops 27 and 80 will be given high not-Q outputs as previously described. Thus the motor will be off and NAND gate 15' will be enabled for actuation upon closure of switch 11. Down operation needs no such enabling, due to the nature of NOR gate 21'. Closure of switch 12 initiates down window movement, with a low not-Q output from flip-flop 29 to the D input of flip-flop 80. The stopping of downward movement either by actuation of switches 11 or 12 or by stall current as previously described for the system of FIG. 1 does not cause a change in the high not-Q output of flip-flop 80. Either upward or downward movement may be initiated after a stop of the window short of full downward travel.

Closure of switch 11 initiates upward movement of the window as previously described and causes a high not-Q output from flip-flop 29 to be applied to the D input of flip-flop 80. In this case an upward edge on the C input of flip-flop 80 changes its output to a high Q, low not-Q state. However, the voltage at the D input of flip-flop 80 remains high only as long as switch 77 remains open. If stall current occurs in this condition of the circuit, reversal of the motor will occur as previously described. Once switch 77 closes, however, the voltage at the D input to flip-flop 80 is pulled low and no motor reversal occurs with stall current.

The embodiments of the invention in which an exclusive property or privilege is claimed are defined as follows:

1. Window motor control apparatus for a vehicle window capable of movement between stopped open and closed positions comprising, in combination:

a motor drive circuit effective to drive the window motor selectively toward the open or closed position of the window, said motor drive circuit comprising a DC motor having an armature connected in an H-switch bridge across an electrical power supply with a first SCR and first FET actuable to conduct armature current in one direction and a second SCR and second FET actuable to conduct armature current in the opposite direction;

first and second actuating means;

a toggle flip-flop having toggle and reset inputs and an output deactivated when the reset input is activated;

an OR logic circuit connecting the first and second actuating means to the toggle input of the toggle flip-flop;

a second flip-flop having a set input responsive to the first actuating means and a reset input responsive to the second actuating means and a pair of outputs, each of the outputs activated in a different one of two stable states;

a first AND logic circuit having inputs from the output of the toggle flip-flop and one of the outputs of the second flip-flop and an output connected to activate the motor drive circuit toward the open position of the window;

a second AND logic circuit having inputs from the output of the toggle flip-flop and the other of the outputs of the second flip-flop and an output connected to activate the motor drive circuit toward the closed position of the window; and means effective to detect stall current in the DC motor armature with the window in the stopped open or closed positions or due to an obstruction to window travel and activate the reset input of the toggle flip-flop, whereby the power supply is protected by the second flip-flop against a direct short circuit through an SCR and a FET in the H-switch bridge.

2. Window motor control apparatus for a motor vehicle window capable of movement between stopped open and closed positions comprising, in combination:
   a motor drive circuit effective to drive the window motor selectively toward the open or closed position of the window, said motor drive circuit comprising a DC motor having an armature connected in an H-switch bridge across an electrical power supply with a first SCR and first FET actuable to conduct armature current in one direction and a second SCR and second FET actuable to conduct armature current in the opposite direction;
   first and second actuating means;
   a toggle flip-flop having toggle and reset inputs and an output deactivated when the reset input is activated;
   an OR logic circuit connecting the first and second actuating means to the toggle input of the toggle flip-flop;
   a second flip-flop having a set input responsive to the first actuating means and a reset input responsive to the second actuating means and a pair of outputs, each of the outputs activated in a different one of two stable states;
   a first AND logic circuit having inputs from the output of the toggle flip-flop and one of the outputs of the second flip-flop and an output connected to activate the motor drive circuit toward the open position of the window;
   a second AND logic circuit having inputs from the output of the toggle flip-flop and the other of the outputs of the second flip-flop and an output connected to activate the motor drive circuit toward the closed position of the window;
   means effective to detect stall current in the DC motor armature with the window in the stopped open or closed positions or due to an obstruction to window travel and activate the reset input of the toggle flip-flop;
   a timer;
   means effective, while the window is moving toward, but has not yet reached, its closed position, to modify the operation of the stall current detecting means such that, upon detection of stall current, it also activates the timer; and
   means responsive to a predetermined period of the timer to activate one of the actuating means to initiate window movement toward the closed position, whereby the power supply is protected by the second flip-flop and the timer against a direct short circuit through an SCR and a FET in the H-switch bridge.

3. Window motor control apparatus for a motor vehicle window capable of movement between stopped open and closed positions comprising, in combination:
   a motor drive circuit effective to drive the window motor selectively toward the open or closed position of the window, said motor drive circuit comprising a DC motor having an armature connected in an H-switch bridge across an electrical power supply with a first SCR and first FET actuable to conduct armature current in one direction and a second SCR and second FET actuable to conduct armature current in the opposite direction;
   first actuating means including a first AND logic circuit having one input from manual actuation means and another input;
   second actuating means including a first OR logic circuit having one input from manual actuation means and another input;
   a toggle flip-flop having toggle and reset inputs and an output deactivated when the reset input is activated;
   a second OR logic circuit connecting the first and second actuating means to the toggle input of the toggle flip-flop;
   a second flip-flop having a set input responsive to the first actuating means and a reset input responsive to the second actuating means and a pair of outputs, each of the outputs activated in a different one of two stable states;
   a second AND logic circuit having inputs from the output of the toggle flip-flop and the output of the second flip-flop activated by the first actuation means and further having an output connected to activate the motor drive circuit toward the open position;
   a third AND logic circuit having inputs from the output of the toggle flip-flop and the output of the second flip-flop activated by the second actuation means and further having an output connected to activate the motor drive circuit toward the closed position;
   a third flip-flop having a clock input, a first output connected to the other input of the first AND logic circuit and a second output connected to the other input of the first OR logic circuit;
   means effective to sense stall current in the DC motor armature;
   RC timer apparatus effective to generate a clock signal a predetermined time after actuation, the clock signal being applied to the clock input of the third flip-flop;
   comparator means effective to compare the stall current sensed by said last means with a reference and, when it exceeds the reference, actuate the reset input of the toggle flip-flop and the timer; and
   means effective, when the window is being driven toward, but has not yet reached, the closed position, to provide a clock enabling signal to the third flip-flop and otherwise to provide a clock inhibiting signal to the third flip-flop, whereby the power supply is protected by the second and third flip-flops and the timer against a direct short circuit through an SCR and a FET in the H-switch bridge.

4. Apparatus according to claim 3 wherein said means to provide clock enabling and disabling signals includes a limit switch actuated in the closed position of the window, said apparatus further comprising:
   a series resistor voltage divider across an electrical voltage source effective to generate the reference voltage for the comparator means; and
   a series transistor switch and additional resistor connected in parallel with one of the resistors of said voltage divider, the conduction of the transistor switch being controlled by the limit switch to vary the reference voltage.

5. Apparatus according to claim 3 wherein:
   the comparator switches from a first state to a second state when the stall current exceeds the reference and switches from the second state to the first state when the stall current falls below the reference again;
   the RC timer apparatus comprises a capacitor adapted to be charged from an electrical current source through a diode when the comparator switches to its second state and to discharge through a resistor when the comparator switches back to its first state;

the RC timer further comprises inverter means effective to generate a rising edge clock signal when the capacitor voltage has fallen from its charged voltage back to a predetermined lower voltage; and the third flip-flop responds only to a rising edge clock signal.

* * * * *